(12) United States Patent
Findlay et al.

(10) Patent No.: US 7,265,335 B2
(45) Date of Patent: Sep. 4, 2007

(54) OPTICAL DEVICE, AND OPTICAL MOUSE INCORPORATING THE OPTICAL DEVICE

(75) Inventors: Ewan Findlay, Limekilns (GB); Giles Dufaure De Lajarte, Edinburgh (GB)

(73) Assignee: STMicroelectronics Ltd., Buckinghamshire (GB)

( * ) Notice: Subject to any disclaimer, the term of this patent is extended or adjusted under 35 U.S.C. 154(b) by 77 days.

(21) Appl. No.: 11/179,323

(22) Filed: Jul. 12, 2005

(65) Prior Publication Data

US 2006/0016967 A1    Jan. 26, 2006

(30) Foreign Application Priority Data

Jul. 22, 2004    (EP) .................................. 04254383

(51) Int. Cl.
*G06M 7/00*    (2006.01)
*G09G 5/08*    (2006.01)

(52) U.S. Cl. ...................... 250/221; 345/166
(58) Field of Classification Search ................ 250/221, 250/227.25, 216; 345/163–166; 362/326, 362/339, 340, 620
See application file for complete search history.

(56) References Cited

U.S. PATENT DOCUMENTS 5,661,303 A * 8/1997 Teder ...................... 250/341.8

5,701,210 A * 12/1997 Ohtaki ...................... 359/831
6,784,946 B1 * 8/2004 Schroter et al. ............ 348/771
2003/0034959 A1   2/2003 Davis et al. ................ 345/166
2003/0098852 A1 * 5/2003 Huang et al. ............... 345/166

FOREIGN PATENT DOCUMENTS

DE    10220890    1/2003
WO    WO 01/27683 A2 *    4/2001

OTHER PUBLICATIONS

PTO 06-4086, Translation of DE 10220890 Theytaz, O. "Optical illumination system and method", Jan. 2, 2003. Translated May 2006.*
"Concise Dictionary", Schwartz et al., Aug. 3, 1999, Chambers Harrap Publishers Ltd., Edimburgh, XP002317589, p. 842, column 1, line 46-50.

* cited by examiner

*Primary Examiner*—Thanh X. Luu
(74) *Attorney, Agent, or Firm*—Lisa K. Jorgenson; Allen, Dyer, Doppelt, Milbrath & Gilchrist, P.A.

(57) ABSTRACT

An optical mouse includes a base and a lens for forming an image on an image sensor package. An LED projects light into the field of view of the lens via a prism. The prism enables the LED to be set horizontally, which reduces optical losses. The prism and lens may form part of a single molding.

25 Claims, 2 Drawing Sheets

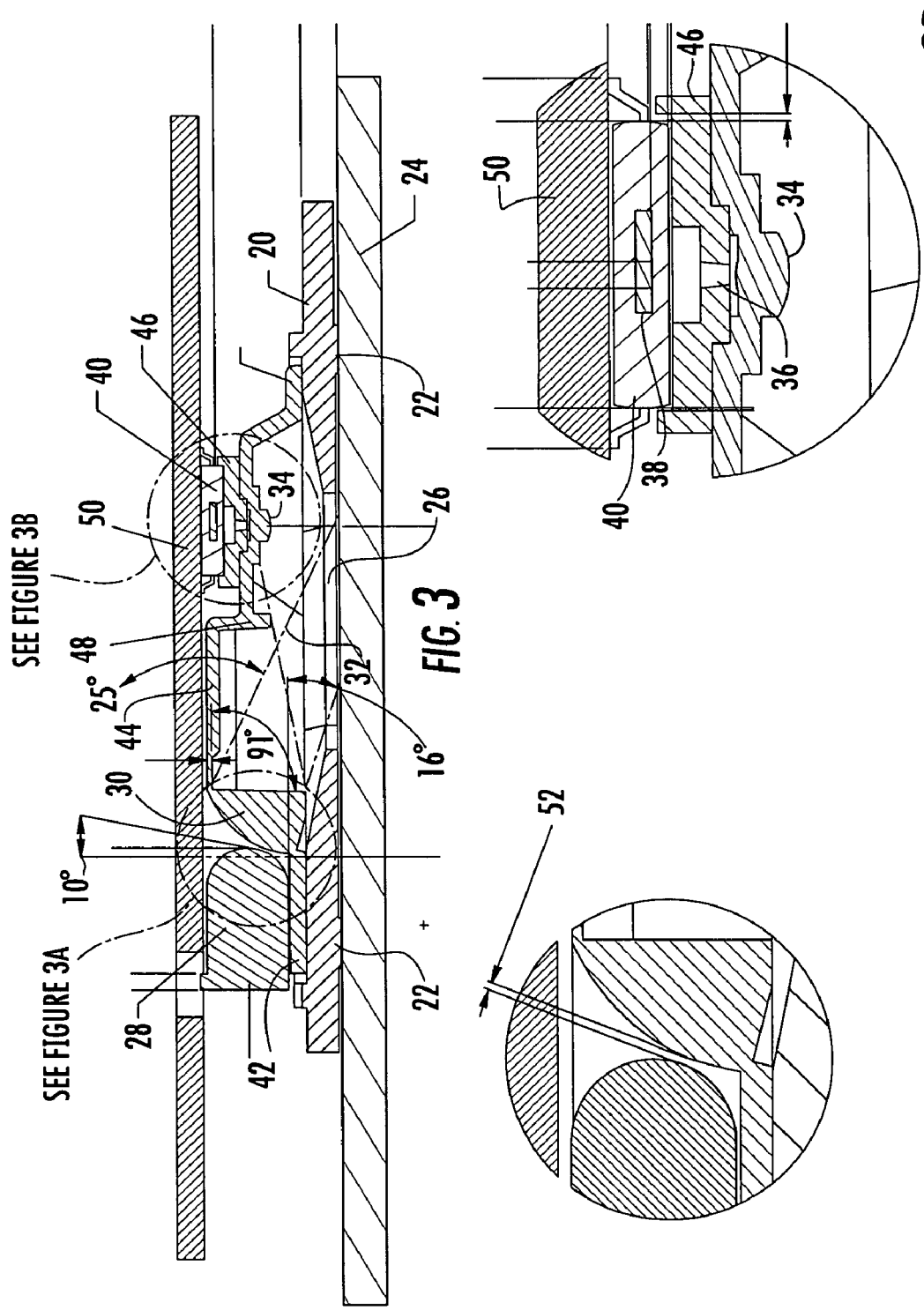

OPTICAL DEVICE, AND OPTICAL MOUSE INCORPORATING THE OPTICAL DEVICE

FIELD OF THE INVENTION

The present invention relates to optical devices, and in particular, to an optical mouse including an optical device.

BACKGROUND OF THE INVENTION

An optical mouse has advantages over a computer mouse that relies on the physical rolling of a ball. A variety of optical mouses are widely available. However, the optical mouses in current commercial use have a number of disadvantages.

One disadvantage is that the thickness or height from the work surface is typically larger when compared to roller-type computer mouses due to constraints imposed by the optical projection and imaging systems included therein. This increase in thickness can be uncomfortable and lead to fatigue for the user. Another disadvantage is that the optical design is unduly complex, typically requiring changes of direction on two or more reflecting surfaces. This leads to additional component and assembly costs.

SUMMARY OF THE INVENTION

In view of the foregoing background, an object of the present invention is to overcome or reduce the problems associated with optical computer mouses.

This and other objects, advantages and features in accordance with the present invention are provided by an optical device which in use is positioned on a surface and illuminates an area of the surface under the device. The device may comprise a light source and a light guide for projecting light from the light source onto the area. The light guide may preferably comprise a body of optically transparent material formed to provide a prism having an input face facing the light source, and an output face spaced from and at an angle to the input face. The light from the light source may be refracted onto the surface by the prism without undergoing reflection.

Another aspect of the present invention is directed to an optical mouse comprising a base adapted for sliding across a surface. The base may include an aperture. The optical mouse may further comprise a light source, an optical assembly arranged to deviate light from the light source through the aperture to impinge on the surface, and a lens mounted in the mouse to view the light projected on the surface. An image sensor may be positioned to receive an image from the lens. The optical assembly is as defined above.

Preferred features of the invention will be apparent from the following description and from the drawings.

BRIEF DESCRIPTION OF THE DRAWINGS

An embodiment of the invention will now be described, by way of example only, with reference to the drawings, in which:

FIG. 3 is a cross-sectional side view of a computer mouse in accordance with one embodiment of the present invention; and FIGS. 3a and 3b show in greater detail and to an enlarged scale selected areas of FIG. 3.

DETAILED DESCRIPTION OF THE PREFERRED EMBODIMENTS

Figure 1:
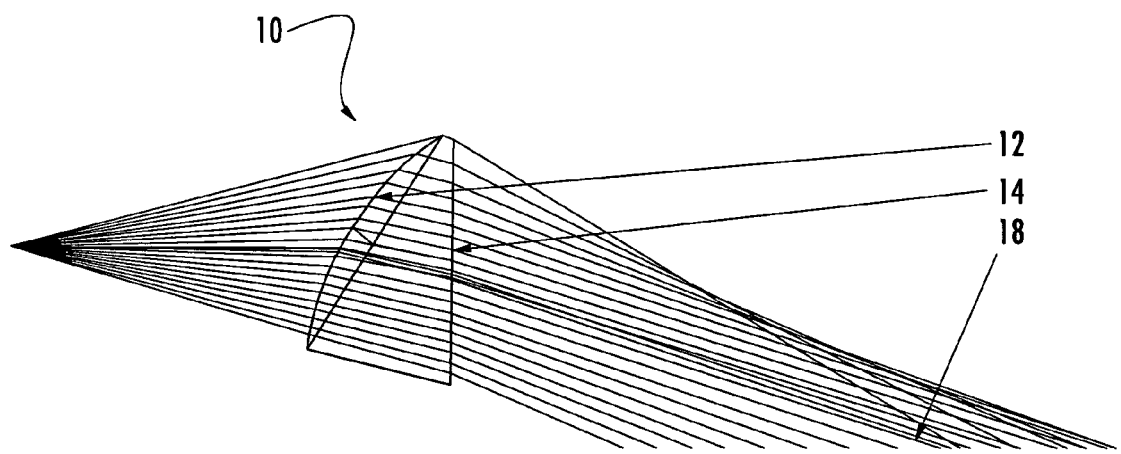
FIGS. 1 and 2 are side views of a prism illustrating the principles of bending light in accordance with the present invention.

Referring to FIG. 1, the present invention is based on the light-bending properties of prisms to allow light from a light source, such as an LED, to be diverted without making use of a reflection. In this embodiment, a prism 10 has an input face 12 and an output face 14. The input face 12 is positively curved to provide light-gathering capability. The input face 12 may be spherically curved, for example.

The rays shown in FIG. 1 represent the output from an LED (not shown in FIGS. 1 and 2) arranged at an angle with respect to the input face 12. The LED has a typical conical output with a semi-angle between 13° to 22°.

The output face 14 is arranged at an angle with respect to the input face 12. Thus, light passing through the input face 12 undergoes bending, and passage through the output face 14 provides further bending.

In this example, the LED axis is horizontal. The input face 12 is tilted between 25° to 45°, and is preferably 32° as shown. The output face 14 is flat or very slightly curved and is substantially vertical, preferably in the range 0 to −5°.

The preferred forms rely on the principle of a prism, set where:

$$\frac{dD}{dI} = 0 \qquad (\text{Eq. 1})$$

D is the deviation angle and I is the angle of incidence of the axial ray. The advantage of this is to have the same overall ray bending even though the light is incident off-axis due to the conical LED output.

The prism 10 is most suitably formed as an integral unit by molding an optical plastic material. The prism 10 acts solely to deflect the light beam without any internal reflection. Thus, the surfaces of the prism 10 other than the input 12 and output 14 surfaces do not need to be of optical quality.

The prism 10 not only provides the desired angle change for the light beam, but also forms the beam into the desired shape, i.e., with a plane or slightly curved wavefront as indicated at 18.

Figure 2:
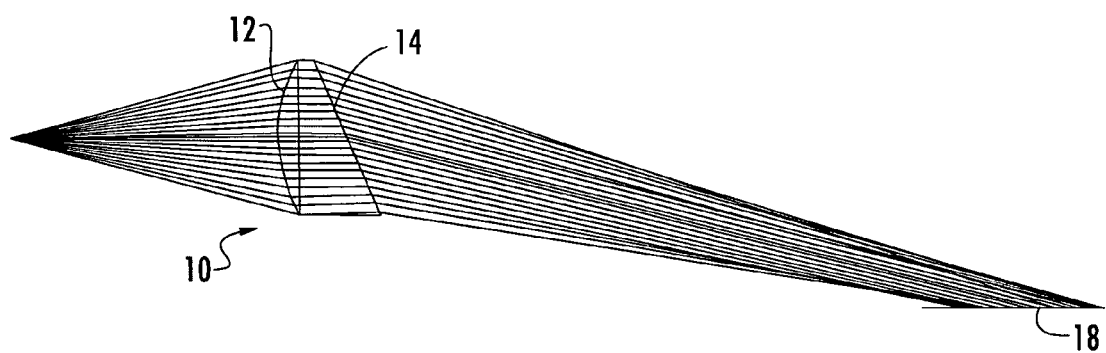

FIG. 2 illustrates an alternative prism that provides the same effects as in FIG. 1, but with a different geometry. In FIG. 2, the input face 12 is vertical (0°) and is positively curved. The output face 14 is flat and is tilted to illuminate at the desired distance between −20° and −32°, with −22° being shown in the example. Here again, the light is deviated to the desired location without being subject to a reflection.

In general terms, the desired result may be achieved with a prism in which the input face has an angle from −10° to +60°, and the output face has an angle from −60° to +10°, with one of the two being substantially vertical (e.g., within ±5°).

FIGS. 1 and 2 show the prism assembly as rotationally symmetrical. However, a non-symmetrical form may be preferred depending on the area to be illuminated.

Turning now to FIG. 3, one specific form of an optical mouse is illustrated using a prism assembly as in FIG. 1. The mouse has a base 20 including ribs 22 upon which it can be slid across a surface, such as a mouse pad 24. The base 20 defines an aperture 26.

An LED 28 is mounted horizontally, i.e., parallel to the mouse pad 24 to provide light 32 via a prism 30 to impinge on the mouse pad 24 via the aperture 26. A lens 34 focuses an image of the illuminated surface via an optical aperture 36 onto the image surface 38 of an image sensor package 40.

The LED 28 is mounted on an extension 42 of the prism 30. To collect the maximum amount of light, the LED 28 is placed close to the prism 30, leaving a gap 52 (FIG. 3a) of 0.1 to 0.4 mm.

In this embodiment, the prism 30 and extension 42 are molded integrally with the lens 34, and are spaced from the lens 34 by a leg 44 of the molding, which also includes a downwardly projecting rib 48 acting as an optical baffle between the prism 30 and the lens 34. The aperture 36 is formed in a member 46 that may also be suitably formed as a plastic molding, and is shaped to cooperate with a formation on the lens molding such that these two parts fit together.

The optical molding 30, 34, 42, 44 makes use of a prism 30 of the type shown in FIG. 1. The molding could equally incorporate a prism of the type shown in FIG. 2. However, the former is preferred since it is simpler and cheaper to mold.

The image sensor package 40, which may be any suitable sensor, such as a CMOS single-chip sensor, is mounted on a printed circuit board 50 that is parallel to the mouse base 20. The PCB 50 mounts other electronic components (not shown), and in particular, the PCB 50 may provide a mounting for the mouse buttons (not shown). Suitable operation of the image sensor package to provide X and Y signals is known in the art and will not be described herein.

Embodiments of the optical device provide a number of advantages. The mouse can be made with a low profile, which allows the light source and tracking sensor to be integrated with the button PCB. The efficient collection of light allows the use of a low power and low cost LED. Only two accurate optical surfaces are required, in comparison with three or more in the prior art. This further reduces costs. The prism angle may be chosen to allow relaxation of constructional tolerances.

The optical device has been illustrated above as being incorporated within an optical mouse. However, those skilled in the art will realize that the principles of the invention can be incorporated in a number of different optical devices suitable for use in a number of different applications.

These applications include the following, for example: a general motion sensor; detection of motion of an object on a person's skin (e.g., to enable shaving with a laser); surface shape detection; measuring presence of rain or dust on a surface, such as a car windshield; switches operable by waving of a hand near an appropriate sensor; checking the position of a moving object in an industrial context; a "virtual mouse" application, whereby hand movements are detected on a glass surface or even in three dimensions; detection of atmospheric changes; a proximity sensor for use as an alarm system or for parking safely; detection of wind speeds; and as a general detector to monitor rotational motion.

That which is claimed:

1. An optical device to be positioned over a surface for illuminating an area thereof, and comprising:
    a light source; and
    a light guide for projecting light from said light source onto the area, said light guide comprising a body of optically transparent material defining a prism and including an input face directed towards said light source and an output face directed away from the input face at an angle so that the light from said light source is refracted onto the area by the prism without undergoing reflection;
    the prism comprising an extension for locating said light source in a given relationship with respect to the input face;
    said light source comprising a light emitting diode (LED) mounted to the extension so that the input face is at an angle with respect to an emission axis of the LED.

2. An optical device according to claim 1, wherein the input face comprises a light-gathering face.

3. An optical device according to claim 2, wherein the input face comprises a positively curved face.

4. An optical device according to claim 1, wherein a plane perpendicular to the area corresponds to a reference angle of 0°; and wherein the input face has an angle within a range of about −10° to +60° with respect to the plane, and the output face has an angle within a range of about −60° to +10° with respect to the plane, with one of the input and output faces having an angle less than ±5°.

5. An optical device according to claim 4, wherein the input face has an angle between 25° and 45°, and the output face has an angle between 0° and −5°.

6. An optical device according to claim 5, wherein the input face has an angle of about 32°, and the output face has an angle of about 0°.

7. An optical device according to claim 4, wherein the input face has an angle of about 0°, and the output face has an angle between −20° and −30°.

8. An optical device according to claim 7, wherein the output face has an angle of about −22°.

9. An optical device according to claim 1, wherein said body of optically transparent material comprises a monolithic body.

10. An optical device according to claim 1, wherein the prism and the extension are integrally formed as a monolithic unit; and further comprising a lens positioned to view the area of the surface on which light is projected by the prism.

11. An optical device according to claim 10, wherein the prism, the extension and the lens are integrally formed as a monolithic unit.

12. An optical mouse comprising:
    a base for sliding across a surface and including an aperture therein;
    a light source for generating light;
    an optical assembly for directing the light from said light source through the aperture, and comprising a prism having an input face directed towards said light source and an output face directed away from the input face at an angle so that the light from said light source is refracted onto the surface by the prism without undergoing reflection;
    a lens for viewing the light projected on the surface; and
    an image sensor for receiving an image from said lens;
    said light source comprising a light emitting diode (LED) parallel to the surface;
    the prism comprising an extension on which said LED is mounted.

13. An optical mouse according to claim 12, wherein said lens is formed as a monolithic unit with the prism and the extension.

14. An optical mouse according to claim 12, further comprising a member interposed between said lens and said image sensor, and said member including an aperture therein.

15. An optical mouse according to claim 14, wherein said member mates with said lens.

16. An optical mouse according to claim 12, further comprising a printed circuit board for carrying said image sensor, said printed circuit board being parallel to the surface across the prism and said lens.

17. A method for operating an optical device comprising a light source and a light guide for projecting light therefrom onto a surface to be illuminated, the method comprising:
   positioning the optical device over the surface to be illuminated; and
   projecting light from the light source using a body of optically transparent material defining a prism, the prism including an input face directed towards the light source and an output face directed away from the input face at an angle so that the light from the light source is refracted onto the surface by the prism without undergoing reflection, the prism comprising an extension for locating the light source in a given relationship with respect to the input face, and the light source comprising a light emitting diode (LED) mounted to the extension so that the input face is at an angle with respect to an emission axis of the LED.

18. A method according to claim 17, wherein the input face comprises a positively curved face.

19. A method according to claim 17, wherein a plane perpendicular to the surface corresponds to a reference angle of 0°; and wherein the input face has an angle within a range of about −10° to +60° with respect to the plane, and the output face has an angle within a range of about −60° to +10° with respect to the plane, with one of the input and output faces having an angle less than ±5°.

20. A method according to claim 17, wherein the prism and the extension are integrally formed as a monolithic unit; and further comprising positioning a lens to view the area of the surface on which light is projected by the prism.

21. A method according to claim 20, wherein the prism, the extension and the lens are integrally formed as a monolithic unit.

22. An optical device to be positioned over a surface for illuminating an area thereof, and comprising:
   a light source; and
   a light guide for projecting light from said light source onto the area, said light guide comprising a body of optically transparent material defining a prism and including an input face directed towards said light source and an output face directed away from the input face at an angle so that the light from said light source is refracted onto the area by the prism without undergoing reflection;
   the input face having an angle between 25° and 45°, and the output face having an angle between 0° and −5°.

23. An optical device according to claim 22, wherein the input face has an angle of about 32°, and the output face has an angle of about 0°.

24. An optical device to be positioned over a surface for illuminating an area thereof, and comprising:
   a light source; and
   a light guide for projecting light from said light source onto the area, said light guide comprising a body of optically transparent material defining a prism and including an input face directed towards said light source and an output face directed away from the input face at an angle so that the light from said light source is refracted onto the area by the prism without undergoing reflection;
   the input face having an angle of about 0°, and the output face having an angle between −20° and −30°.

25. An optical device according to claim 24, wherein the output face has an angle of about −22°.

* * * * *

UNITED STATES PATENT AND TRADEMARK OFFICE
CERTIFICATE OF CORRECTION

PATENT NO. : 7,265,335 B2
APPLICATION NO. : 11/179323
DATED : September 4, 2007
INVENTOR(S) : Findlay et al.

It is certified that error appears in the above-identified patent and that said Letters Patent is hereby corrected as shown below:

Title Page, item 75      Delete: "Giles"
                                          Insert -- Gilles --

Signed and Sealed this

Twentieth Day of May, 2008

JON W. DUDAS
*Director of the United States Patent and Trademark Office*